(12) United States Patent
Allam et al.

(10) Patent No.: US 8,101,043 B2
(45) Date of Patent: Jan. 24, 2012

(54) COLORED PRIMER COMPOSITIONS AND METHODS

(75) Inventors: Dominic J. Allam, Canton, MI (US); Marc A. Pocock, Orion Township, MI (US)

(73) Assignee: Dow Global Technologies LLC, Midland, MI (US)

( * ) Notice: Subject to any disclaimer, the term of this patent is extended or adjusted under 35 U.S.C. 154(b) by 776 days.

(21) Appl. No.: 12/035,770

(22) Filed: Feb. 22, 2008

(65) Prior Publication Data

US 2009/0017312 A1 Jan. 15, 2009

Related U.S. Application Data

(60) Provisional application No. 60/949,369, filed on Jul. 12, 2007.

(51) Int. Cl.
B05D 5/10 (2006.01)

(52) U.S. Cl. ............... 156/314; 156/331.1; 427/287

(58) Field of Classification Search ............ 156/331.1, 156/314; 427/207.1, 287; 528/44
See application file for complete search history.

(56) References Cited

U.S. PATENT DOCUMENTS

| | | | |
|---|---|---|---|
| 3,152,162 A | 10/1964 | Fischer et al. | |
| 3,549,396 A | 12/1970 | Dietz | |
| 3,743,626 A | 7/1973 | Emmons | |
| 4,374,210 A | 2/1983 | Ewen et al. | |
| 4,385,133 A | 5/1983 | Alberino et al. | |
| 4,394,491 A | 7/1983 | Hoffman | |
| 4,496,611 A | 1/1985 | Kawakubo | |
| 4,522,975 A | 6/1985 | O'Conner et al. | |
| 4,643,794 A | 2/1987 | Saracsan | |
| 4,672,100 A | 6/1987 | Schonbachler | |
| 4,697,026 A | 9/1987 | Lee | |
| 4,735,830 A | 4/1988 | Oezelli et al. | |
| 4,792,316 A | 12/1988 | Skedeleski et al. | |
| 4,835,012 A | 5/1989 | Saur | |
| 4,839,122 A | 6/1989 | Weaver | |
| 4,874,805 A | 10/1989 | Mulhaupt et al. | |
| 4,910,279 A | 3/1990 | Gillis et al. | |
| 4,963,614 A | 10/1990 | Ito et al. | |
| 5,010,202 A | 4/1991 | Greco | |
| 5,114,989 A | 5/1992 | Elwell et al. | |
| 5,128,423 A | 7/1992 | Parrinello | |
| 5,167,899 A | 12/1992 | Jezic | |
| 5,391,588 A | 2/1995 | Sakamoto et al. | |
| 5,466,727 A * | 11/1995 | Hsieh ......................... | 523/421 |
| 5,529,655 A | 6/1996 | Bravet et al. | |
| 5,567,530 A | 10/1996 | Drujon et al. | |
| 5,623,044 A | 4/1997 | Chaio | |
| 5,664,041 A | 9/1997 | Szum | |
| 5,840,428 A | 11/1998 | Blizzard | |
| 5,922,809 A | 7/1999 | Bhat et al. | |
| 5,948,927 A | 9/1999 | Gunther | |
| 6,008,305 A * | 12/1999 | Wang et al. ............... | 525/440.03 |
| 6,048,579 A | 4/2000 | Wang et al. | |
| 6,080,817 A | 6/2000 | Thieben et al. | |
| 6,133,398 A | 10/2000 | Bhat | |
| 6,228,433 B1 | 5/2001 | Witt | |
| 6,395,856 B1 | 5/2002 | Petty et al. | |
| 6,438,306 B1 | 8/2002 | Bishop | |
| 6,592,998 B2 | 7/2003 | Anderson et al. | |
| 6,592,999 B1 | 7/2003 | Anderson et al. | |
| 6,623,791 B2 | 9/2003 | Sadvary et al. | |
| 6,649,016 B2 | 11/2003 | Wu et al. | |
| 6,875,470 B2 | 4/2005 | Trabesinger et al. | |
| 6,974,500 B2 | 12/2005 | Miyata et al. | |
| 7,022,748 B2 | 4/2006 | Wilke et al. | |
| 7,087,127 B2 | 8/2006 | Mahdi et al. | |
| 7,122,289 B2 | 10/2006 | Wilke et al. | |
| 7,332,225 B2 * | 2/2008 | Lewno ....................... | 428/425.6 |
| 7,416,599 B2 * | 8/2008 | Hsieh et al. ............... | 106/287.11 |
| 7,691,479 B2 * | 4/2010 | Schmatloch et al. ...... | 428/423.1 |
| 7,807,016 B2 * | 10/2010 | Schwoeppe et al. ...... | 156/331.7 |
| 2001/0041782 A1 | 11/2001 | Okuhira et al. | |
| 2002/0086914 A1 | 7/2002 | Lee et al. | |
| 2003/0084955 A1 | 5/2003 | Smith et al. | |
| 2003/0100676 A1 | 5/2003 | Okuhira et al. | |
| 2003/0105230 A1 | 6/2003 | Hellmann | |
| 2004/0106718 A1 | 6/2004 | Krohn | |
| 2004/0191521 A1 | 9/2004 | Weiss et al. | |
| 2005/0081995 A1 | 4/2005 | Beckley | |
| 2005/0113484 A1 | 5/2005 | Kamen et al. | |
| 2005/0126414 A1 | 6/2005 | Weiss et al. | |
| 2005/0126683 A1 | 6/2005 | Hsieh | |

(Continued)

FOREIGN PATENT DOCUMENTS

EP 414375 A 2/1993

(Continued)

OTHER PUBLICATIONS

Copending U.S. Appl. No. 11/959,208 (U.S. Appl. No. 60/913,700), filed Apr. 24, 2007.

(Continued)

*Primary Examiner* — Thao T. Tran
(74) *Attorney, Agent, or Firm* — Dobrusin & Thennisch PC

(57) ABSTRACT

A method for bonding a substantially transparent substrate within an opening of a structure, including steps of applying to a substantially transparent substrate a primer composition that includes a colorant; applying an adhesive to the structure defining the opening; and installing the substantially transparent substrate within the opening, wherein the resulting installed substrate is substantially free of any ceramic enamel. Also disclosed are assemblies that include a primer composition that includes a colorant and is substantially free of any ceramic enamel.

8 Claims, No Drawings

U.S. PATENT DOCUMENTS

| | | |
|---|---|---|
| 2005/0154076 A1 | 7/2005 | Bach |
| 2006/0198963 A1 | 9/2006 | Chernyshov et al. |
| 2006/0287408 A1 | 12/2006 | Baikerikar et al. |
| 2008/0268259 A1 | 10/2008 | Schmatloch |
| 2008/0269452 A1 | 10/2008 | Schwoeppe |

FOREIGN PATENT DOCUMENTS

| | | |
|---|---|---|
| EP | 592138 A | 4/1994 |
| EP | 666290 | 8/1995 |
| EP | 666290 | 9/1995 |
| EP | 687713 | 10/1997 |
| EP | 1153090 | 12/2000 |
| EP | 1217049 A1 | 6/2002 |
| EP | 1231241 | 8/2002 |
| EP | 1231241 A | 8/2002 |
| EP | 1382625 A | 1/2004 |
| EP | 1382652 A | 1/2004 |
| JP | 09235513 A * | 9/1997 |
| JP | 10036481 A | 2/1998 |
| JP | 2002012635 A | 1/2002 |
| JP | 2002/309163 A | 10/2002 |
| JP | 2002/309182 A | 10/2002 |
| JP | 2003/128988 A | 5/2003 |
| JP | 2003/226731 A | 8/2003 |
| JP | 2003/336008 A | 11/2003 |
| JP | 2004168957 A | 6/2004 |
| JP | 2007063551 A | 3/2007 |
| WO | 00/00530 A1 | 1/2000 |
| WO | 00/06512 A1 | 2/2000 |
| WO | 01/47644 A1 | 7/2001 |
| WO | 01/77245 A2 | 10/2001 |
| WO | 03/011583 A1 | 2/2003 |
| WO | 03/011583 A2 | 2/2003 |
| WO | 03/011986 A1 | 2/2003 |
| WO | 03/011992 A2 | 2/2003 |
| WO | 2006/042305 A1 | 4/2006 |
| WO | 2007/002328 | 1/2007 |
| WO | 2008/036721 | 3/2008 |
| WO | 2008/045726 A | 4/2008 |

OTHER PUBLICATIONS

Copending U.S. Appl. No. 12/033,420 (U.S. Appl. No. 60/870,639), filed Dec. 18, 2007.
Copending U.S. Appl. No. 11/958,983 (U.S. Appl. No. 60/870,643), filed Dec. 18, 2007.
Copending U.S. Appl. No. 11/959,107 (U.S. Appl. No. 60/870,641), filed Dec. 18, 2007.
Copending U.S. Appl. No. 12/041,915 (U.S. Appl. No. 60/913,703), filed Mar. 4, 2008.
Copending U.S. Appl. No. 12/033,447 (U.S. Appl. No. 60/913,706), filed Feb. 19, 2008.
Copending U.S. Appl. No. 61/014,547, filed Dec. 18, 2007, by Baikerikar et al., "Protective Coating for Window Glass Having Enhanced Adhesion to Glass Bonding Adhesiveness."
Kohler, Journal of the American Chemical Society, vol. 49, p. 3181 (1927), describing the Zerewitnoff test.
International Search Report, Application No. PCT/US2005/054706, Date Aug. 11, 2008.

* cited by examiner

COLORED PRIMER COMPOSITIONS AND METHODS

CLAIM OF PRIORITY

The present application claims the benefit of the filing date of Provisional Application No. 60/949,369 (filed Jul. 12, 2007) the contents of which are hereby incorporated by reference in their entirety.

FIELD OF THE INVENTION

This invention relates to bonding of substantially transparent substrates, and more specifically to glass bonding for automotive vehicle applications.

BACKGROUND OF THE INVENTION

In a number of automotive vehicle window assemblies, a transparent substrate is employed that includes a darkened or opaque peripheral band, and specifically an inorganic frit along one or more of its edges. The band is typically formed by applying a ceramic enamel to a glass substrate and then firing the coated glass to achieve a tenacious bond between the ceramic enamel and the glass. The need to fire such ceramic enamels essentially requires that glass be employed to withstand the firing conditions. Unfortunately, following firing, resulting defects tends to result in scrap of the coated glass substrate.

When properly prepared, glass substrates are installed into an opening in an automotive vehicle structure by applying one or more layers of primer to the glass substrate, over the layer of fired ceramic enamel, applying an adhesive between the primer and the vehicle structure, and locating the glass substrate within the opening.

One approach to simplification of window assembly has been proposed in co-pending application Ser. No. 11/472,119 filed Jun. 20, 2006 (priority to 60/692,318 filed Jun. 20, 2005), now U.S. Pat. No. 7,781,493 by Baikerikar et al. (incorporated by reference), also published as WO/2007/002328. Notwithstanding the benefits of the technology disclosed therein, it is contemplated that future applications will continue to justify additional attractive bonding systems.

SUMMARY OF THE INVENTION

The present invention is directed to a unique method for bonding a substantially transparent substrate within an opening of a structure, comprising the steps of applying to a substantially transparent substrate a primer composition that includes a colorant; applying an adhesive to the structure defining the opening; and installing the substantially transparent substrate within the opening, wherein the resulting installed substrate is substantially free of any ceramic enamel. The present invention also contemplates assemblies resulting from the practice of the methods herein, or that otherwise include a colored primer for bonding to a substrate in the absence of a layer of ceramic enamel. Glass substrates are installed into an opening in an automotive vehicle structure by applying one or more layers of primer to the glass substrate, over the layer of fired ceramic enamel, applying an adhesive between the primer and the vehicle structure and locating the glass substrate within the opening. The invention pertains to a method for bonding a first substrate to a second substrate, including the steps of (a) applying to one or both of the substrates a primer composition that includes an adhesion promoter, which is an adduct prepared by the reaction of at least one aromatic polyisocyanate compound (e.g., a trifunctional, including a thiophosphate group, with an active hydrogen moiety of an organofunctional silane (e.g., an aminosilane, a mercapto-silane, or a combination thereof); (b) applying an adhesive to at least one of the substrates; and (c) assembling the two substrates.

DETAILED DESCRIPTION

In general, the invention herein is predicated upon the employment of a base primer that includes at least one colorant and includes at least one prepolymer derived from the reaction of at least one polyisocyanate and at least one polyol, and particularly one that will have a free isocyanate content. In a more particular aspect, the primer includes an isocyanate functional prepolymer derived from the reaction of an aliphatic polyisocyanate and a polyol. In one highly specific embodiment, the primer includes an isocyanate functional prepolymer derived from the reaction of an aliphatic polyisocyanate and a polyol, and is at least partially reacted with an amino group of a silane, and particularly an aminosilane (e.g., a secondary aminosilane), wherein the aminosilane includes a plurality of alkoxy groups bound to one or more silicon atoms (e.g., two or three methoxy groups bound to, silicon, two or three ethoxy groups bound to silicon, a combination thereof or the like). Examples of commercially available base primers that may be employed in accordance with the present teaching include, without limitation, Betaprime™ 5500 or Betaprime™ 5404, available commercially from The Dow Chemical Company.

The colorants for use herein may be selected for providing a substantial match with a color of a surrounding environment, for providing a predetermined color scheme, or both. For example, the colorant may be selected to generally approximate a paint color of an automotive vehicle to which the compositions herein are bonded. Examples of colorants that may be employed include one or more oxides (e.g., titanium dioxide, iron oxide, cerium oxide), carbon black, any combination thereof or otherwise. The colorants may also be selected from one or more other materials (e.g., one or more organic materials). The colorants may be provided as a pigment, a dye, or a combination thereof. The colorant may be a naturally occurring colorant, a synthetically derived colorant, or a combination thereof. The colorant may be selected to provide a metallic appearance, an iridescent appearance, a fluorescent appearance, a glossy appearance, a matte appearance, a semi-glossy appearance, or any combination thereof.

Examples of organic pigments include, but are not limited to, phthalocyanines, anthraquinones, perylenes, carbazoles, monoazo- and disazobenzimidazolones, isoindolinones, monoazonaphthols, diarylidepyrazolones, rhodamines, indigoids, quinacridones, diazopyranthrones, dinitranilines, pyrazolones, dianisidines, pyranthrones, tetrachloroisoindolinones, dioxazines, monoazoacrylides, anthrapyrimidines or mixtures thereof. See also, colorants described in U.S. Patent Application 2002/0086914 relevant portions incorporated herein by reference.

The colorant will typically be employed in an amount up to about 15 percent by weight of the overall primer composition (e.g., from about 0.1 to about 15 percent by weight of the overall primer composition, such as about 1, 2, 3, 5, 8, 12 or even 15 percent by weight of the overall primer composition).

It is thus contemplated that the compositions herein include a reaction product of an isocyanate, and an isocyanate-reactive compound. In one specific aspect, the invention contemplates the employment of a composition that includes a prepolymer that is derived from the reaction of at least one aliphatic polyisocyanate and a polyol, and is at least partially reacted with the active hydrogen of an organofunctional silane. The prepolymer may be part of a base primer composition.

By way of example, the isocyanates useful herein may be selected from diisocyanates, tri-isocyanates or any combination thereof. Suitable isocyanates may include an aliphatic, cycloaliphatic, aralphatic, heterocyclic, aromatic isocyanate, or any combination thereof. Particular examples may include an isocyanate selected from hexamethylene diisocyanate (HDI), isophorone diisocyanate (IPDI), methylene diphenyl 4,4'-diisocyanate (MDI) or any combination thereof, and still more particularly one selected from isophorone diisocyanate (IPDI), methylene diphenyl 4,4'-diisocyanate (MDI), toluene diisocyanate (TDI), or any combination thereof. As noted, polymeric derivatives of any of the isocyanates herein are also contemplated.

The isocyanates may typically have a percent NCO amount of up to about 25%, more specifically up to about 15%, and still more specifically up to about 10% by weight of the overall primer composition. For example the percent NCO may range from about 1 to about 10%, and more specifically about 3 to about 8%. Preferably the polyisocyanates used have an average isocyanate functionality of at least about 2.0 and an equivalent weight of at least about 80. Preferably, the aliphatic isocyanate functionality of the polyisocyanate is at least about 2.0, more preferably at least about 2.2, and is most preferably at least about 2.4; and is preferably no greater than about 4.0, more preferably no greater than about 3.5, and is most preferably no greater than about 3.0. Higher functionality may also be used. Preferably, the equivalent weight of the polyisocyanate is at least about 100, more preferably at least about 110, and is most preferably at least about 120; and is preferably no greater than about 300, more preferably no greater than about 250, and is most preferably no greater than about 200.

Exemplary isocyanate-reactive compounds may be an organic compound having at least two isocyanate-reactive moieties, such as a compound containing an active hydrogen moiety, or an iminofunctional compound. For the purposes of this invention, an "active hydrogen" containing moiety refers to a moiety containing a hydrogen atom which, because of its position in the molecule, displays significant activity according to the Zerewitnoff test described by Wohler in the Journal of the American Chemical Society, Vol. 49, p. 3181 (1927). Illustrative of such active hydrogen moieties are —COOH, —OH, —NH$_2$, —NH—, —CONH$_2$, —SH, and —CONH—. Preferable active hydrogen containing compounds include polyols, polyamines, polymercaptans and polyacids. Suitable imino-functional compounds are those which have at least one terminal imino group per molecule, such as are described, for example, in U.S. Pat. No. 4,910,279, which is hereby incorporated by reference in its entirety.

Suitable polyols may include, for example, polyether polyols, polyester polyols, poly(alkylene carbonate)polyols, hydroxyl-containing polythioethers, polymer polyols, and mixtures thereof. Polyether polyols may include, for example, one or more diols, triol, or tetrols based upon polyoxyethylene, polyoxypropylene, potyoxybutylene, and/or polytetramethylene ether. In general, polyether polyols are prepared by polymerizing alkylene oxides in the presence of an active hydrogen-containing initiator compound. Most preferred, however, are alkylene-oxide-capped polyols.

Preferably, the isocyanate-reactive compound has a functionality of at least about 2.0, more preferably at least about 3.0, and is preferably no greater than about 5.0, more preferably no greater than about 4.5, and is most preferably no greater than about 4.0. Preferably, the equivalent weight of the isocyanate-reactive compound is at least about 200, more preferably at least about 500, and is more preferably at least about 1,000; and is preferably no greater than about 5,000, more preferably no greater than about 3,000, and is most preferably no greater than about 2,500. One particular example employs a polyol isocyanate reactive compound that has an equivalent weight of from about 100 to about 1500, and more specifically about 300 to about 1000.

The isocyanate and isocyanate reactive compound may be reacted in the presence of a suitable catalyst. Catalysts for use herein may include, for example, a metal complex such as a stannous or stannic compound. Examples include a stannous salt of a carboxylic acid (e.g., stannous octoate, stannous oleate, stannous acetate, and stannous laurate), a trialkyltin oxide, a dialkyltin dicarboxylate (e.g., dibutyltin dilaurate, dibutyltin diacetate, diethyltin diacetate, and dihexyltin diacetate), a dialkyltin dihalide, or a dialkyltin oxide, such as di-2-ethylhexyltin oxide or dioctyltin dioxide, a tertiary amine, or a tin mercaptide. Other catalysts may also be used. For example, tertiary amine catalysts include trialkylamines (e.g., trimethylamine, triethylamine), heterocyclic amines, such as N-alkylmorpholines (e.g. N-methylmorpholine, N-ethylmorpholine, dimethyldiaminodiethyl ether, etc.), 1,4-dimethylpiperazine, triethylenediamine, etc. Aliphatic polyamines, such as N,N,N',N'-tetramethyl-1,3-butanediamine may also be used as catalysts. One highly preferred catalyst includes a dibutyltin compound, and more specifically, it includes or consists essentially of dibutyltin dilaurate. Another specific example of a useful catalyst is 2,2'-dimorpholino diethyl ether (DMDEE).

The isocyanate and isocyanate reactive compound may be reacted also in the presence of a suitable silane (e.g., an aminosilane) for introducing silicon into the primer.

The compositions herein may include one or more other ingredients, such as a solvent, a stabilizer, a film former, a filler, an ultraviolet protectant, or any combination thereof.

By way of example, the solvent component of the primer composition generally is volatile and is preferably a solvent that will dissolve and/or disperse the components at a temperature in the range of from about −10° C. to about 100° C., more preferably from about 0° C. to about 40° C. The solvent is preferably anhydrous in order to help prevent the isocyanates from prematurely reacting with water. Examples of such solvents include xylene, ethylbenzene, toluene, ethylacetate, propyl acetate, butyl acetate, butanol, propanol, isopropanol, ethanol, butoxyl, 2-butoxyethanol, 3-methoxybutylacetate, NMP, n-heptane, petroleum, butyl acetate, acetone, and methyl ethyl ketone, or any combination thereof, and is preferably butoxyl, methyl ethyl ketone or a mixture thereof. The solvent will comprise the balance any of the resulting or intermediate compositions and is preferably used in an amount of at least about 50 percent, more preferably at least about 55 percent, and most preferably at least about 60 percent; and is preferably no greater than about 90 percent, more preferably no greater than about 85 percent, and most preferably no greater than about 80 percent, based on the weight of the total primer composition.

It is also possible that the compositions-herein will include one or more adhesion promoters, such as is taught in commonly owned Application Ser. No. 60/913,706, now U.S. Pat. No. 7,807,016 incorporated by reference. Such an adhesion promoter thus may be a reaction product of an organofunctional silane and an isocyanate (e.g., such that the adhesion promoter includes at least one aromatic poly-isocyanate, which more particularly includes phosphorus). An example of one such iscoyanate is described generally in U.S. Pat. No.

6,974,500, incorporated by reference. One possible isocyanate is tris(p-isocyanato)thiophosphane. A particularly preferred isocyanate is a thiophosphate with a isocyanate group such as a solution of tris(p-isocyanato-phenyl)-thiophosphate in ethyl acetate sold under the tradename DESMODUR RFE and commercially available from Bayer Corporation, Pittsburgh, Pa.

The primer compositions herein may be employed in any of a number of applications. One particular approach is to apply the primer composition (e.g. as a one part composition), using art-disclosed techniques, to a substrate for use in an automotive vehicle windshield, backlight, side window, sun/moon roof, architectural window, skylight, porthole, door opening, display case, a lens or otherwise. Another useful application is for printing if labels, packages, containers (e.g., beverage bottles), or otherwise. A preferred application is the use of the primer compositions herein to make substantially transparent panel assemblies. The assemblies herein may be adapted for temporary or permanent mounting to a structure. The assemblies may be adapted for opening, closing, or otherwise translating, e.g., by sliding, by articulating, by pivoting, by folding, or any combination thereof. The assemblies thus may be employed in one or more applications such as automotive vehicle backlights, side windows, sun/moon roofs, architectural windows, skylights, portholes, door openings, display cases, or otherwise. The compositions and methods herein are also particularly useful when employed in combination with pre-applied adhesive systems, onto an electrostatically primed (i.e., an e-coated) substrate, a painted substrate or any combination thereof.

Typically, the substrates will be substantially flat or shaped, e.g., for defining a curved surface. The substrates will generally be panels that are transparent through at least one surface, and particularly through both opposing surfaces, over at least about 25% of the area of the surface, and more specifically, at least a majority (e.g., at least about 60%, 75% or even 90% of the area of the surface). The substrates herein generally will be made from a substantially amorphous material, and particularly an amorphous ceramic (such as glass), a plastic, or a combination thereof. Without limitation, examples of suitable substrate materials include poly(meth)acrylates, polycarbonates, vinyls (e.g., polyvinyl chlorides), polyesters (e.g., oriented polyesters), polyimides, polyolefins, polyamides, glass, any combinations thereof (e.g. a laminated glass), or the like. In a particular example, the substrates include or even consist essentially of a material selected from glass, poly(meth)acrylates, polycarbonates or any combination thereof. Substrates may have a laminated layer, a tint or any combination thereof. Substrates may also be a reaction injection molded plastic. Assemblies that include reaction injection molded parts encapsulating a panel, such as a substantially transparent panel, may be bonded according to the teachings herein. An example of one possible approach to the manufacture of encapsulated panels is disclosed in U.S. Patent Application Ser. No. 60/870,643 now U.S. Pat. No. 7,939,161 (entitled: "ENCAPSULATED PANEL ASSEMBLIES AND METHODS FOR MAKING SAME": incorporated by reference). The compositions herein may also be employed for bonding a surface of a pinchweld assembly.

Though some applications may call for the coating of substantially an entire surface of a substrate with the composition herein, ordinarily the compositions will be applied to the substrates selectively, according to a predetermined pattern (e.g., substantially along an edge portion of the substrate, about the periphery of the substrate, or otherwise). For example, one approach is to apply the composition from the edge of the substrate inwards toward the central portion in a width of about 2, 5, 8, or even 12 cm or greater. It is also possible that the composition will may be applied for defining one or more lines, curves, dots, or other geometric configurations comprising segments of constant or varying width height, length or other dimension.

Any of a variety of art-disclosed patterns may be applied. The primer composition may be applied to a substrate (e.g., glass or coated plastic) using any art-disclosed means, such as using a brush, roller, sprayed onto the surface, ink jet printing, screen printing and the like. It may be applied using art-disclosed robotic application devices (e.g., one having at least 2 axes of motion). After application of the composition to the surface of the substrate, it is exposed to polymerization conditions.

The substrates herein typically will include at least one surface onto which the composition is applied. The surface may optionally be treated for improving the bond strength of the composition to the substrate, e.g. by a primer, a flame spray, a corona treatment, a plasma treatment, or some other surface treatment. However, in one specific example, the outer surface is substantially free of any surface treatment. Accordingly, upon application, the composition is in direct intimate contact with the substrate, and particularly in the substantial absence any intermediate interface layer. Of course, after applying the composition to the substrate it is also possible to apply over some or all of one or both of the composition and substrate a further layer (e.g., a silicone, an acrylic, a polyurethane, or otherwise, for realizing a protective over-layer). It is also possible that the composition herein may be employed over, beneath and/or adjacent an inorganic or an organic frit (e.g., a frit of the type taught in co-pending application Ser. No. 11/472,119 filed Jun. 20, 2006 (priority to 60/692,318 filed Jun. 20, 2005)), now U.S. Pat. No. 7,781,493 by Baikerikar et al. (incorporated by reference).

When applied, the composition herein generally will have a thickness of up to about 250 microns or higher. More commonly it will be less than about 150 microns, less than about 100 microns or even less than about 50 microns (e.g., about 10 to about 30 microns or smaller).

Examples of suitable adhesives or sealants for use in combination with the primer compositions of the present invention include, without limitation, one-part or two-part urethane compositions, which in turn may be moisture curable. Particularly preferred urethanes are based upon MDI, HMDI, or a combination thereof. Examples of commercially available adhesives include, without limitation, those available from The Dow Chemical Company under the designation BETASEAL™ such as one or more of grade Nos. 58702, 16000 or the like.

The invention also contemplates kits that include an adhesive or sealant composition and one or more primer compositions. For example, such a kit might include one or more primer compositions in accordance with the present invention, with or without the adhesive or sealant composition (e.g., a one-part urethane or a two-part urethane adhesive). It may also include one or more cleaners, applicators, tapes, tools or any combination thereof. The compositions herein may be provided in a cartridge, a foil pack or both.

The compositions herein provide a generally hard and abrasion resistant coating. It is also expected that the compositions will exhibit excellent adhesion performance and weatherability. The resulting primer materials freshly prepared according to the teachings herein also is expected to have good storage stability.

Assemblies according to the teachings herein are expected to demonstrate 100% cohesive failure after aging 7 days at room temperature; more preferably, also after aging an additional 7 days subject to water immersion; still more preferably, also after aging an additional 7 days at 90° C.; yet still more preferably, also after 7 additional days cataplasma cycling. It is also possible that compositions herein will demonstrate 100% cohesive failure after still yet after 14 additional days cataplasma cycling.

In general, for the cataplasma cycling, the samples are stored directly in a climatic chamber at 70° C., 100% relative humidity, for 7 days, or wrapped in cotton wool, humidified with sufficient water and sealed in a polyethylene bag to be held thereafter in an oven at 70° C. for 7 days. Next, the samples are placed in a freezer for 16 hours at −20° C., after which the sample is allowed to stand at room temperature for 2 hours. The cycle is repeated multiple times, after which the samples are removed from the bag and subjected to the quick knife adhesion test. Desirably, there is no blistering of the primer layer, and failure is cohesive in the sealant layer.

The following examples illustrate the teachings herein. Similar results are believed possible for compositions wherein the amounts of the ingredients varies by within about 10 or even about 25 percent of the recited amounts. The examples thus also teach a range of concentrations that would fall within such variation.

Example

Lap shear test samples are prepared in accordance with proposed SAE J1721. Glass samples are wiped with isopropyl alcohol. They are then optionally primed with clear primer (e.g., BETASEAL® 43518 clear primer) and allowed to flash about 1 minute. A wet film thickness of about 0.01 to about 0.03 mm is applied. For the clear primer, the excess material is wiped within about 5 seconds of wetting the glass. The colored primer composition of the present invention is applied over any included clear primer to a thickness of about 0.006 to about 0.03 mm dry film thickness. The colored primer composition includes carbon black. After about 10 minutes, sealant is then contacted with the resulting primer composition product (e.g., BETASEAL® 58702). The samples are allowed to cure for 7 days at 23 degrees C. and about 50% relative humidity. The samples are then subject to environmental exposure, e.g. by weatherometer per SAE J 1885 (e.g., for at least 1000 hours). The samples are given about 24 hours to recover and are tested in shear at a rate of about 12.7 cm/minute, otherwise following ASTM D3163.

Specifically, a quick knife adhesion test is performed, by which a 6.3 mm (width)×6.3 mm (height)×127 mm (length) size bead of adhesive is placed on 25.4 mm×152.4 mm piece of a primed glass, and the assembly is cured for a specific time under the desired conditions (e.g., 23° C. and 50 percent relative humidity). The cured bead is then cut with a razor blade through to the primed surface at a 45 degree angle while pulling back the end of the bead at 180 degree angle. Notches are cut every 3 mm on the surface. The degree of adhesion is evaluated as adhesive failure (AF) and/or cohesive failure (CF). In case of adhesive failure, the cured bead can be separated from the primed surface, while in cohesive failure, separation occurs within the sealant bead as a result of cutting and pulling. In observing the failure mode, it is noted over what portion of the interfacial surface area the failure mode is observed. For example, if cohesive failure is observed in about 90 percent (%) of the interfacial area, it can be reported as 90 CF. Primer failure (PF) is deemed to have occurred if the primer delaminates from the substrate (e.g., glass) to which it is applied. Cohesive failure of 100% (100 CF) results for each of the samples. In some instances, it is possible that glass breakage occurs (GB), meaning specifically that the primed glass breaks before the sealant fails. The expected results are set forth in the following Table 1.

TABLE 1

| Sample | Primer/Sealant Layers | Strength (psi/kPa) | Failure Mode |
|---|---|---|---|
| 1A | 5500/58702 | 663 (4571 kPa) | 100% CF |
| 1B | 5500/58702 | 629 (4337 kPa) | 100% CF |
| 1C | 5500/58702 | 620 (4275 kPa) | 100% CF |
| 1D | 5500/58702 | 625 (4310 kPa) | 100% CF |
| 1E | 5500/58702 | 556 (3834 kPa) | 10% CF; 90% GB |
| Average | | 590 (4068 kPa) | |
| 2A | 43526/58702 | 587 (4047 kPa) | 30% CF; 70% GB |
| 2B | 43526/58702 | 516 (3558 kPa) | 70% CF; 30% GB |
| 2C | 43526/58702 | 633 (4364 kPa) | 100% GB |
| 2D | 43526/58702 | 644 (4440 kPa) | 70% CF; 30% GB |
| 2E | 43526/58702 | 652 (4495 kPa) | 100% GB |
| Average | | 648 (4468 kPa) | |
| 3A | 43518/43520A/58702 | 649 (4474 kPa) | 100% CF |
| 3B | 43518/43520A/58702 | 643 (4433 kPa) | 100% CF |
| 3C | 43518/43520A/58702 | 675 (4654 kPa) | 100% CF |
| 3D | 43518/43520A/58702 | 481 (3316 kPa) | 80% CF; 20% GB |
| 3E | 43518/43520A/58702 | 611 (4213 kPa) | 100% CF |
| Average | | 546 (3765 kPa) | |

Similar results are believed possible when substituting other colorants described herein for the carbon black. Similar results are also believed possible upon weatherability testing according to the above for at least 2000 hours.

Samples are also believed to withstand cataplasma cycling by which the samples are heated in a water bath at 70° C. for 7 days. The samples are then wrapped in cotton wool and sealed in a polyethylene bag. Next, the samples are placed in a freezer for 16 hours at −20° C., after which the sample is allowed to stand at room temperature for 2 hours. The cycle is repeated multiple times, after which the samples are removed from the bag and subjected to the above-described quick knife adhesion test. Desirably, there is no blistering and failure is cohesive in the sealant layer.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the invention. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. References to an acrylic or (meth)acrylic (or derivative terms such as "acrylate") contemplate meth-acrylics and acrylics (and corresponding derivative terms). Ingredients discussed herein may form part of the resulting composition. However, they also may form pert of an additive for the resulting composition. For example, it is possible that the adhesion promoter is a vehicle for delivering an ingredient into an admixture for forming the resulting composition. Unless otherwise stated, references to "adhesive" or "sealant" are interchangeable. Thus, mention of an adhesive of a particular composition also encompasses a sealant of such composition.

Though disclosed herein generally in the context of use in a one step primer composition, the invention is not so limited. Also contemplated are the possible use of a primer system that includes multiple components. For example, it is possible that a clear primer (e.g., one that is free of any ceramic enamel) is applied to a substrate and then the primer including the colorant is applied over the clear primer. Examples of commercially available clear primers include Betaseal™ 16100, 43518 or the like, from The Dow Chemical Company. Further though disclosed with specific reference to Betaprime™ 5500 or Betaprime™ 5404, other primer systems may be modified according to the teachings herein, such as Betaprime™ 16100, Betaprime™ 43526 or Betaprime™ 43520A.

What is claimed is:

1. A method for bonding a transparent substrate within an opening of a structure, comprising the steps of:
   a. applying to a transparent substrate a primer composition that includes a colorant and at least one isocyanate functional prepolymer derived from the reaction of an aliphatic polyisocyanate and a polyether polyol wherein the prepolymer is at least partially reacted with the active hydrogen of an organofunctional silane;
   b. applying an adhesive to the structure defining the opening or to the primer composition on the transparent substrate; and
   c. installing the transparent substrate within the opening, wherein the resulting installed substrate is free of any ceramic enamel.

2. The method of claim 1, wherein the step (a) includes a step of applying a silanated compound to the transparent substrate prior to applying the primer composition that includes the colorant.

3. The method of claim 2, wherein the structure defining the opening is part of an automotive vehicle having a predetermined color, the colorant includes titanium dioxide, iron oxide, cerium oxide, carbon black, a phthalocyanine, an anthraquinone, a perylene, a carbazole, a monoazo- or disazobenzimidazolone, an isoindolinone, a monoazonaphthol, a diarylidepyrazolone, a rhodamine, an indigoid, a quinacridone, a diazopyranthrone, a dinitraniline, a pyrazolone, a dianisidine, a pyranthrone, a tetrachloroisoindolinone, a dioxazine, a monoazoacrylide, an anthrapyrimidine or any mixture thereof, or both.

4. The method of claim 3, wherein the at least one isocyanate functional prepolymer is at least partially reacted with an amino group of a secondary aminosilane that includes a plurality of alkoxy groups bound to one or more silicon atoms.

5. The method of claim 4, wherein the colorant is present in an amount up to about 15 percent by weight of the overall primer composition.

6. The method of claim 1, wherein the at least one isocyanate functional prepolymer is derived from the reaction of an aliphatic polyisocyanate and a polyether polyol, at least partially reacted with an amino group of a secondary aminosilane, wherein the secondary aminosilane includes a two or three methoxy groups bound to silicon, two or three ethoxy groups bound to silicon, or a combination thereof.

7. The method of claim 1 wherein the primer composition further comprises an adhesion promoter comprising a reaction product of an organofucntional silane and an aromatic isocyanate containing a thiophosphate group.

8. The method of claim 3 wherein the colorant includes carbon black.

* * * * *